US 6,637,269 B2

(12) United States Patent
Reck et al.

(10) Patent No.: US 6,637,269 B2
(45) Date of Patent: Oct. 28, 2003

(54) MOTOR VEHICLE AIR SPRING SYSTEM HAVING AN ULTRASONIC MEASUREMENT ARRANGEMENT

(75) Inventors: Siegfried Reck, Nienburg (DE); Volker Plett, Langenhagen (DE)

(73) Assignee: Contitech Luftfedersystem GmbH, Hannover (DE)

( * ) Notice: Subject to any disclaimer, the term of this patent is extended or adjusted under 35 U.S.C. 154(b) by 6 days.

(21) Appl. No.: 09/982,080

(22) Filed: Oct. 19, 2001

(65) Prior Publication Data

US 2002/0046608 A1 Apr. 25, 2002

(30) Foreign Application Priority Data

Oct. 19, 2000 (DE) .......................................... 100 51 825

(51) Int. Cl.[7] .................................................. G01N 9/24
(52) U.S. Cl. ............................. 73/627; 73/618; 73/632
(58) Field of Search .......................... 73/627, 629, 618, 73/632, 620, 584, 290 V, 597; 267/64.19

(56) References Cited

U.S. PATENT DOCUMENTS

| 4,798,369 A | * | 1/1989 | Geno et al. ............... 267/64.11 |
| 4,918,672 A | * | 4/1990 | Iwabuchi et al. ............. 367/99 |
| 5,418,758 A | * | 5/1995 | Webster ...................... 367/101 |
| 5,642,869 A | * | 7/1997 | Miller .................... 246/182 B |
| 5,936,161 A | * | 8/1999 | Fischer ........................ 73/632 |
| 6,032,535 A | * | 3/2000 | Fischer et al. ................ 73/629 |
| 6,073,491 A | * | 6/2000 | Fischer et al. ................ 73/629 |
| 6,223,600 B1 | * | 5/2001 | Fischer et al. ................ 73/629 |

FOREIGN PATENT DOCUMENTS

DE 36 20 957 1/1987

* cited by examiner

Primary Examiner—Hezron Williams
Assistant Examiner—Jacques Saint-Surin
(74) Attorney, Agent, or Firm—Walter Ottesen

(57) ABSTRACT

An air spring system for a motor vehicle includes essentially a flexible member (4) having first and second ends. At a first end, the flexible member is closed off by the cover plate (8) as a connecting part and, at its second end, by a roll-off piston (10) as a second connecting part. To carry out a contactless distance measurement in accordance with the pulse/echo method in the interior space (6) of the air spring (2), an ultrasonic transmitter/receiver (14) is mounted on one of the two connecting parts (8, 10) and a reflector (16) is provided on the other one of the two connecting parts (8, 10). A separate reference reflector (18) is not used in order to simplify the construction and to save mounting space for the components. Instead, the reflector is configured as a two-step reflector. The one step functions as a target reflector (16) and the other step (26) functions as a reference reflector. A bumper (28) is preferably configured as a two-step target reflector (16). The step, which is configured in the bumper (28) is realized as a blind bore (20).

5 Claims, 5 Drawing Sheets

MOTOR VEHICLE AIR SPRING SYSTEM HAVING AN ULTRASONIC MEASUREMENT ARRANGEMENT

FIELD OF THE INVENTION

The invention relates to a motor vehicle air spring system having an ultrasonic arrangement for the contactless distance measurement in accordance with the pulse/echo method.

BACKGROUND OF THE INVENTION

An air spring comprises essentially a flexible member having an upper end closed off by a cover plate and a lower end closed off by a roll-off piston. The cover plate is preferably fixed to the chassis and the roll-off piston is mounted on an axle.

The variable clear distance between the cover plate and the roll-off piston within the air spring is measured with the aid of ultrasonic pulses for determining the air spring height. The method most used is the pulse/echo method. Here, an ultrasonic signal is propagated from an ultrasonic converter attached to the cover. The ultrasonic signal is reflected by a reflector mounted on the roll-off piston and is received by an ultrasonic converter mounted on the cover and is further transmitted to an evaluation electronic unit for evaluation.

The distance passed through by the ultrasonic signal is computed from the running time of the signal and the speed of sound. From this distance, the spring height can be computed.

Alternatively, the ultrasonic converter can be mounted on the roll-off piston in lieu of on the cover. The reflector would then have to be mounted on the cover in lieu of on the roll-off piston.

The sonic speed needed for computing the distance is dependent upon temperature. Measuring methods with additional reference paths are suggested in order to avoid a complicated temperature compensation when determining the height of the air spring.

It is necessary to provide the ultrasonic converter, which is configured as a transmitter/receiver, with an elastic or damped suspension in order to avoid a propagation of body sound within the air spring components. This has the consequence that the ultrasonic converter moves backward somewhat when there is a pressure increase whereby the distance to the reference reflector fixedly mounted to the housing is correspondingly increased which, in turn, has the consequence that the measurement value is made erroneous.

German patent publication 3,620,957 discloses such an air spring having an ultrasonic pulse/echo system for measuring height. An additional fixed target is suggested in order to preclude the effects of running-speed changes of the pulses which can occur because of changes in air pressure, temperature and humidity in the interior of the flexible member. This additional fixed target is a reflector in the form of a planar metal disc attached to a stem-like rod. The reflector is arranged spatially fixed in front of the ultrasonic transmitter.

With the above, various disadvantages result. The fixed target comprising the stem-like rod and the metal disc is a mechanically sensitive component. Because the fixed target has a certain structural elevation, the clear elevation of the air spring is reduced and therefore also the maximum possible deflection path of the air spring. On the other hand, the needed structural elevation required for the air spring is increased. A further disadvantage is that the reflector is mounted relatively close to the ultrasonic transmitter and, in this way, the useful signal, which is received over the additional distance, is drowned out by the reference signal possibly to the extent of unrecognizability.

SUMMARY OF THE INVENTION

In view of the foregoing, it is an object of the invention to provide an air spring system for a motor vehicle having an ultrasonic arrangement for the contactless distance measurement in accordance with the pulse/echo method which ameliorates the above-mentioned disadvantages.

The air spring system of the invention is for a motor vehicle and includes: a first connecting part defining a cover plate; a second connecting part defining a roll-off piston; a flexible member having a first end connected to the first connecting part and a second end connected to the second connecting part; an ultrasonic arrangement for making contactless measurements of the distance between the first and second connecting parts; the ultrasonic arrangement including an ultrasonic transmitter/receiver mounted on one of the connecting parts and a reflector mounted on the other one of the connecting parts; the reflector being configured as a two-step reflector having first and second steps; and, one of the steps being a target reflector and the other one of the steps being a reference reflector.

The above air spring system comprises essentially that a reference path is provided not fixed in position relative to the transmitter but fixed in position relative to the reflector.

The advantages achieved with the invention include the absence of a reference reflector assigned to a sensor, a general simplification of the construction and a reduction of the space needed for components.

Of great significance is the reliability in the evaluation. A reference reflector at a short distance forward of the sonic converter generates an echo in each case. This is under some circumstances so great that it over-controls the electronics so that, in an individual case, an echo from a greater distance cannot be recognized. By utilizing the two-stage reflector according to the invention, measurement and reference signals have comparatively large amplitudes so that measurement difficulties with respect thereto are no longer present. If the reference and target echos are of approximately the same intensity, then this increases the reliability in the evaluation of the running times. A single automatic control is sufficient.

Preferably, the transmitter/receiver unit is disposed on the air spring cover, that is, this unit is preferably fixed to the chassis and the two-stage target reflector is mounted on the roll-off piston. In this way, the connection of the transmitter/receiver unit with the corresponding electronic component is simplified.

A further embodiment of the invention provides that the bumper, which is usually disposed on the roll-off piston, is configured as a two-stage target reflector. No space for components is lost with the configuration of this kind.

The two-stage target reflector can be realized by a central blind bore placed in the bumper.

If the transmitter/receiver is arranged off-center on the cover (for example, because of a centrally arranged carrier), it is understood that the two-stage target reflector can also be mounted off-center or inclined in the direction toward the transmitter/receiver component on or in the bumper.

With experiments carried out, it has been shown that a blind bore having a diameter of 12 mm and a depth of 7.5 mm provides reliably reproducible results.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
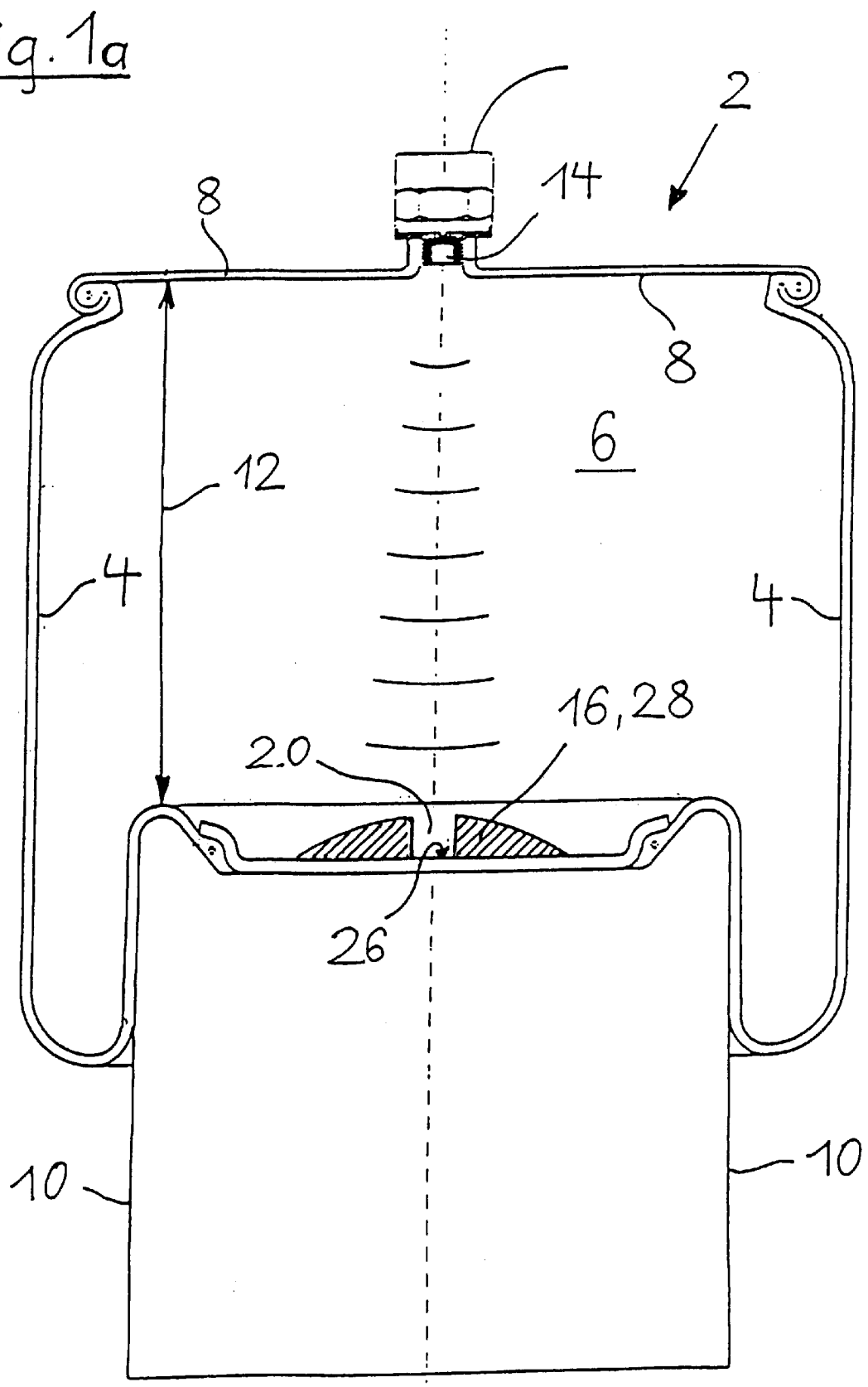
FIG. 1a is a side elevation view, in longitudinal section, of an air spring equipped with a measuring system according to an embodiment of the invention.
Figure 1B:
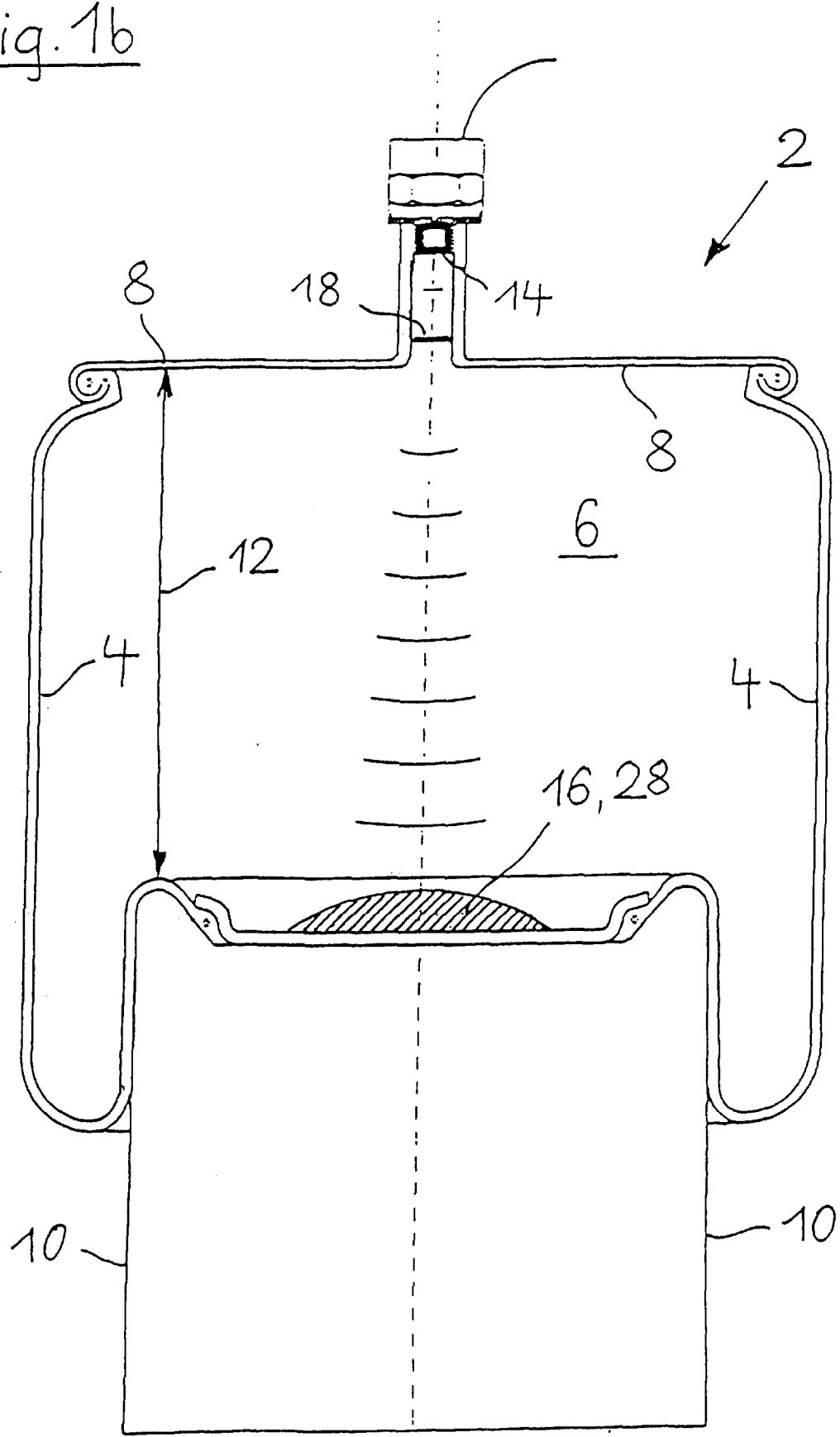
FIG. 1b is a side elevation view, in longitudinal section, of an air spring equipped with a measuring system in accordance with the prior art.

The air spring 2 shown in FIGS. 1a and 1b comprises essentially a flexible member 4 which encloses the air spring interior space 6 which is under pressure. The flexible member 4 is closed off by a cover plate 8 at the chassis end. At the opposite-lying end, the flexible member 4 can roll off on a roll-off piston 10 with the rhythm of the spring deflection during operation of the air spring. The roll-off piston 10 is mounted at the wheel end. An ultrasonic converter 14 functions as a transmitter/receiver and is mounted on the cover plate 8 for the purpose of measuring the clear spring height 12. A reflector 16 is attached to the roll-off piston 10 and lies opposite this ultrasonic converter 14.

The ultrasonic converter 14 transmits individual ultrasonic pulses at time intervals and these pulses pass through the clear elevation 12 of the interior space of the air spring and, after the pulses are reflected by the reflector 16, they return to the ultrasonic converter 14 functioning as a receiver. As initially mentioned herein, the instantaneous clear spring elevation 12 is determined from the running time of the respective ultrasonic pulses. Here, the time between the transmission of the pulse and the reception of the echo is an index or measure for the spring elevation.

The running time of a pulse is dependent upon the speed (c) with which the sound is propagated in the air spring and this is, in turn, dependent upon the temperature and the density of the air.

In order to eliminate these influences on the result of the running time measurement, a reference reflector 18 is introduced in accordance with the state of the art shown in FIG. 1b at a defined distance from the ultrasonic converter 14. The measurable running time of the reference signal is:

$$t_{ref} = 2 \cdot S_{ref}/c. \quad (I)$$

For the running time to the reflector 16, the following applies:

$$t_{target} = 2 \cdot S_{target}/c. \quad (II)$$

The measuring result is obtained from the ratio of the running times so that the propagation velocity (c) and the factor 2 can be cancelled out:

$$S_{target} = S_{ref} t_{target}/t_{ref}. \quad (III)$$

Figure 3:
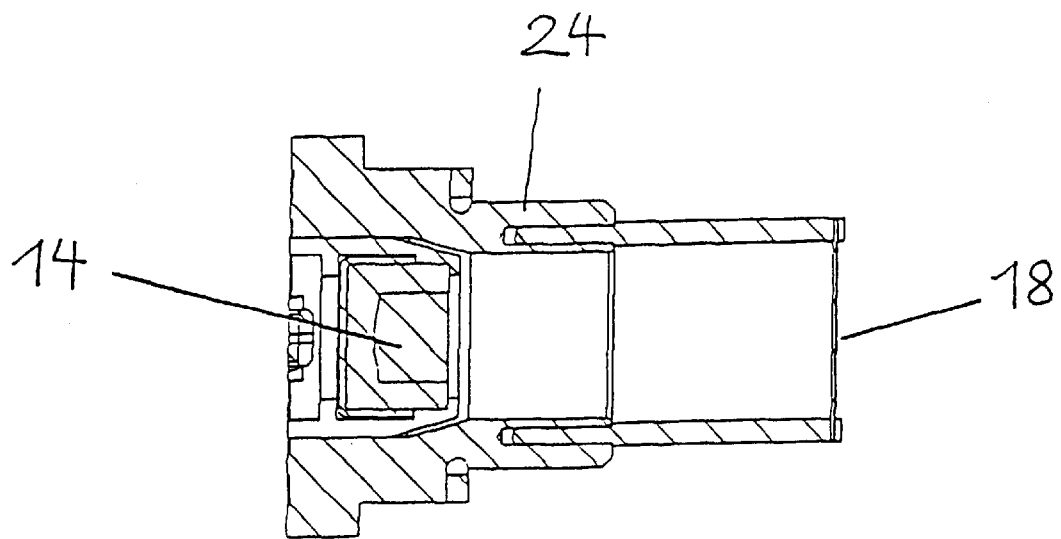
FIG. 3 is a schematic, in longitudinal section, of a combination of a sonic transducer and a reference reflector of a conventional type.

Previously, the reference reflector 18 was mounted directly forward of the sonic converter 14 in the axial direction. FIGS. 1b and 3 show such a component wherein a reference reflector 18 is positioned in the immediate proximity to the sonic converter 14.

Figure 2:
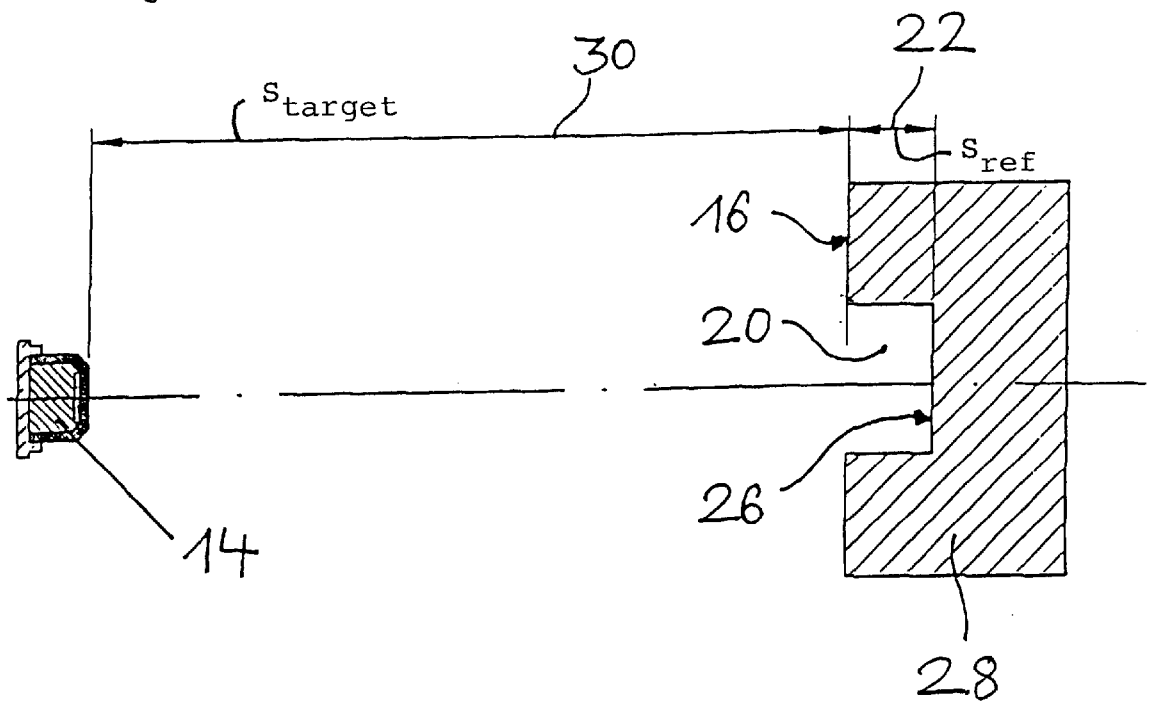
FIG. 2 is a schematic showing the measuring arrangement equipped with an ultrasonic converter and a two-stage reflector.

In the principle for measuring the reference signal shown in FIGS. 1a and 2, a recess 20 is introduced into the target reflector 16 in accordance with the invention and the depth 22 ($s_{ref}$) of this recess 20 functions as a reference path. In this way, the filigreed and complex reference reflector 18 (FIGS. 1b and 3) is unnecessary so that the housing of the elevation sensor 24 can be configured correspondingly shorter.

Equation (I) applies to the running time of the sonic pulse to the target reflector 16 and back. The running time of the reference echo from the base 26 of the recess 20 is given by:

$$t_{ref} = 2 \cdot (S_{target} + S_{ref})/c. \quad (IV)$$

From equations (I) and (IV), the distance to the target reflector 16 is obtained in dependence upon the measurable running times from:

$$S_{target} = t_{target} \cdot S_{ref}/(t_{ref} - t_{target}). \quad (V)$$

In order to check the basic function of the arrangement according to the invention, a series production bumper 28 is provided with a central blind bore 20 having a diameter of 12 mm and a depth 22 of 7.5 mm. An ultrasonic converter 14 is disposed at a spacing 30 of 180 mm and has a drive circuit and evaluation circuit associated therewith.

Figure 4:
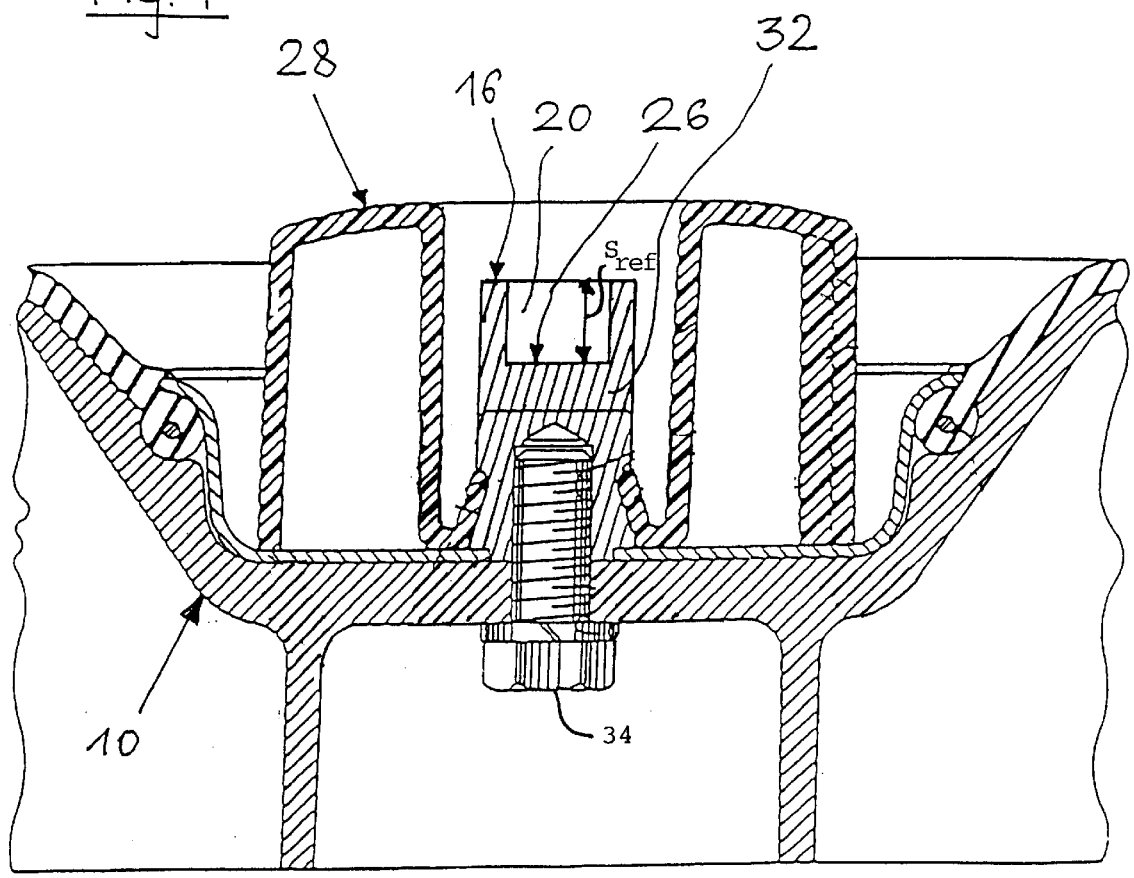
FIG. 4 is an embodiment of the reflector according to the invention also in longitudinal section.

FIG. 4 shows a specific embodiment of a bumper 28 having an integrated reflector unit 32. This reflector unit 32 comprises a metal or plastic cylinder which is attached with the aid of a screw 34 to the roll-off piston 10. The reflector unit 32 has a blind bore 20 in the direction toward the ultrasonic converter 14. The upper edge of the blind bore 20 functions as a target reflector 16 and the base 26 of the recess 20 functions as a reference reflector.

Figure 5:
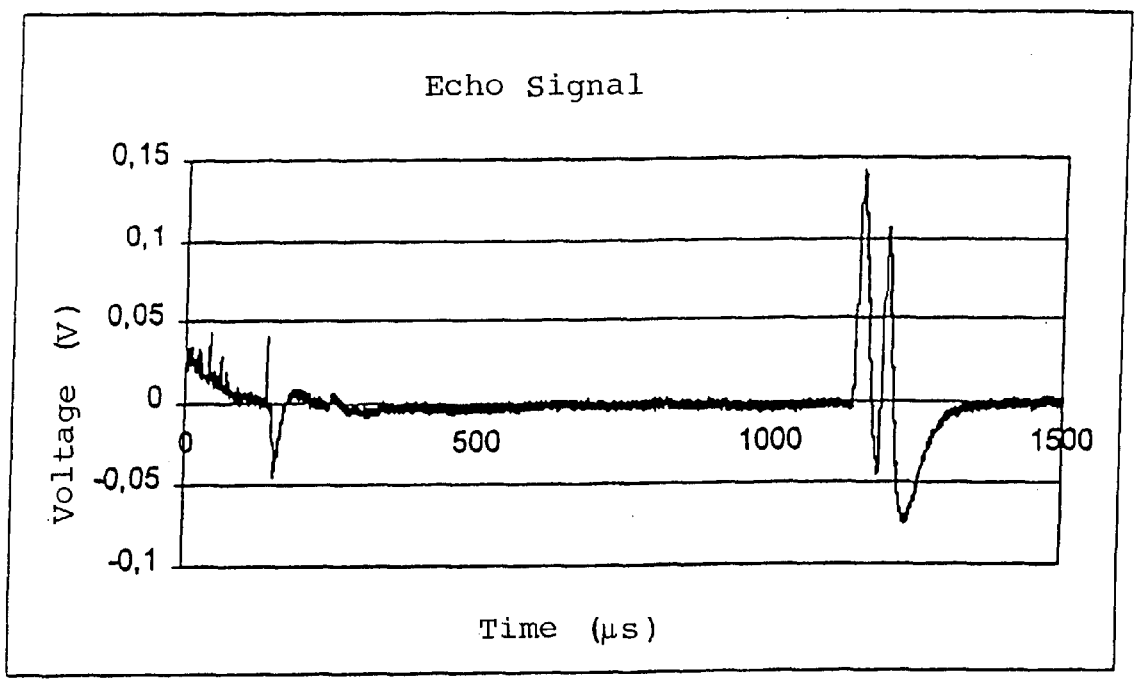
FIG. 5 is an oscillogram of an echo signal in accordance with the invention; and, FIG. 6 is a detail of the oscillogram shown in FIG. 5.

FIG. 5 shows the oscillogram of the echo signal. The double echo which is generated by the modified bumper 28 is clearly recognizable. The first component echo impinges after the time $t_{target}$ and the second after interval $t_{ref}$. The time interval of the two echoes corresponds to the depth 22 of the blind bore 20.

Figure 6:
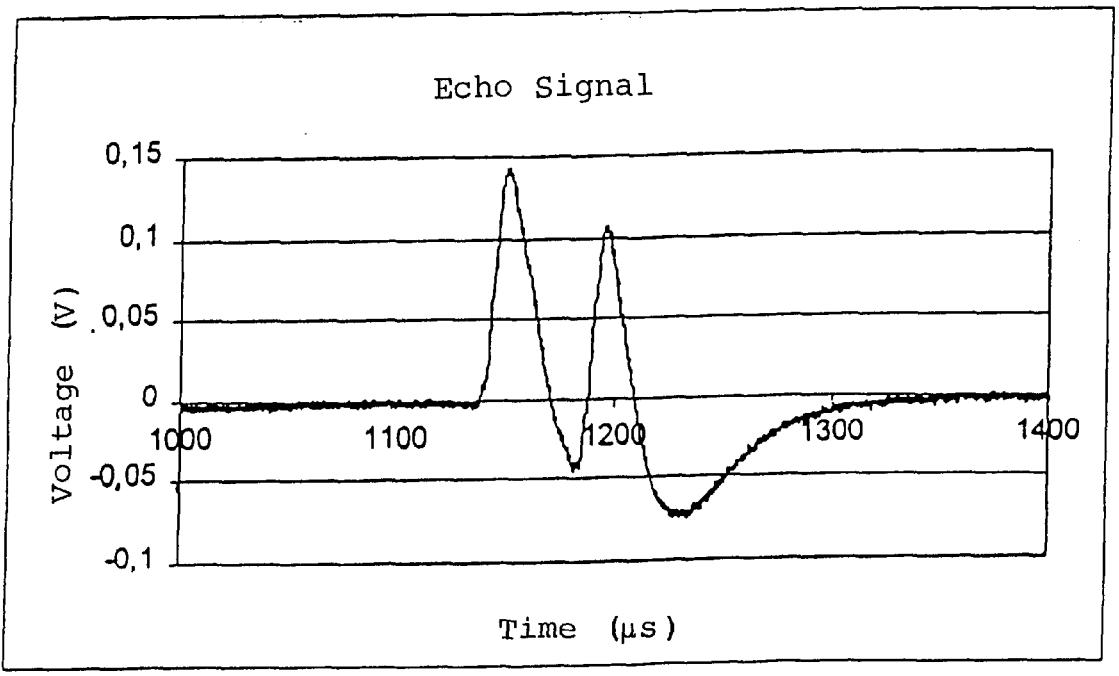

FIG. 6 shows the electric signal of the double echo in time-expanded illustration. The pulse which has gone through the longer distance (here, the reference signal), generates a smaller echo signal.

It is understood that the foregoing description is that of the preferred embodiments of the invention and that various changes and modifications may be made thereto without departing from the spirit and scope of the invention as defined in the appended claims.

What is claimed is:

1. An air spring system for a motor vehicle, the air spring system comprising:

a first connecting part defining a cover plate;

a second connecting part defining a rolloff piston;

said first and second connecting parts being disposed at a spacing from each other which rapidly changes with the movement of said motor vehicle over a road surface;

a flexible member having a first end connected to said first connecting part and a second and connected to said second connecting part;

an ultrasonic arrangement for making contactless measurements of the distance between said first and second connecting parts;

said ultrasonic arrangement including an ultrasonic transmitter/receiver mounted on one of said connecting parts and a reflector mounted on the other one of said connecting parts;

said reflector being configured as a twostep reflector having first and second steps; and, one of said steps being a target reflector and the other one of said steps being a reference reflector and both of said reflectors being at respective distances from said ultrasonic transmitter/receiver which likewise rapidly change as said spacing changes.

2. The air spring of claim 1, wherein said cover plate, said roll-off piston and said flexible member conjointly define an air spring having an air spring interior; and, said air spring system further comprises a bumper mounted on one of said cover plate and said roll-off piston so as to face toward said interior of said air spring; and, said bumper is configured as said two-step reflector.

3. The air spring of claim 2, wherein said ultrasonic transmitter/receiver is mounted on said cover plate so as to face toward said interior; and, said two-step reflector is mounted on said roll-off piston so as to face toward said interior.

4. The air spring of claim 2, wherein the step of said two-step reflector is defined by a central blind bore formed in said bumper.

5. The air spring of claim 4, wherein said central blind bore has a diameter of 12 mm and a depth of 7.5 mm.

\* \* \* \* \*

UNITED STATES PATENT AND TRADEMARK OFFICE
CERTIFICATE OF CORRECTION

PATENT NO. : 6,637,269 B2
DATED : October 28, 2003
INVENTOR(S) : Siegfried Reck and Volker Plett It is certified that error appears in the above-identified patent and that said Letters Patent is hereby corrected as shown below:

<u>Title page,</u>
Item [73], Assignee, delete "Contitech Luftfedersystem" and substitute
-- ContiTech Luftfedersysteme -- therefor.

<u>Column 4,</u>
Line 58, delete "rolloff" and substitute -- roll-off -- therefor.
Line 63, delete the second "and" and substitute -- end -- therefor.

<u>Column 5,</u>
Line 5, delete "twostep" and substitute -- two-step -- therefor.

Signed and Sealed this

Thirtieth Day of December, 2003

JAMES E. ROGAN
*Director of the United States Patent and Trademark Office*